United States Patent
Funk

(10) Patent No.: US 6,244,111 B1
(45) Date of Patent: Jun. 12, 2001

(54) MICROMECHANICAL GRADIENT SENSOR

(75) Inventor: Karsten Funk, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/428,618

(22) Filed: Oct. 27, 1999

(30) Foreign Application Priority Data

Oct. 30, 1998 (DE) .............................................. 198 50 066

(51) Int. Cl.$^7$ .................................................. G01C 19/00
(52) U.S. Cl. ...................................................... 73/504.13
(58) Field of Search ............................... 73/488, 504.02, 73/504.12

(56) References Cited

U.S. PATENT DOCUMENTS

| | | | |
|---|---|---|---|
| 5,872,313 | * | 2/1999 | Zarabadi et al. ........................ 73/497 |
| 5,889,207 | * | 3/1999 | Lutz ................... 73/504.13 |
| 5,955,668 | * | 5/2000 | Hsu et al. ........................ 73/504.12 |
| 6,062,082 | * | 5/2000 | Guenther et al. ................. 73/514.16 |

* cited by examiner

Primary Examiner—Richard A. Moller
(74) Attorney, Agent, or Firm—Kenyon & Kenyon

(57) ABSTRACT

A micromechanical gradient sensor having a substrate, a ring body which is mounted elastically above the substrate with the assistance of a first spring device, a driving device which is connected to the ring body for driving the ring body to rotary motions about the ring axis, and an acceleration sensing device which is secured to the ring body via a second spring device. The acceleration sensing device is designed in such a manner that, as a result of the centrifugal force acting due to the rotary motions, and as a result of the force acting against the spring tension of the two spring devices due to the gravitational acceleration, the acceleration sensing device is able to travel out along the sensor axis connecting it, and running through the ring axis. Also included is an evaluation unit for determining the excursion of the acceleration sensing device and for determining the angle of inclination of sensor axis relative to the perpendicular component.

26 Claims, 3 Drawing Sheets

MICROMECHANICAL GRADIENT SENSOR

FIELD OF THE INVENTION

The present invention relates to a micromechanical gradient sensor.

BACKGROUND INFORMATION

Although applicable to any micromechanical gradient sensors, the present invention as well as its underlying problem are explained with respect to a gradient sensor which is manufacturable using the technology of silicon surface micromechanics.

Generally, gradient sensors can have many uses in the consumer goods and construction industries, for example, in self-adjusting spirit levels, self-adjusting construction lasers, zero-stable gravitational acceleration sensors for monitoring structures (bending of bridges, gradient of buildings, etc.), or, generally, in the alarm technology, for example, in vehicles such as ships, passenger cars, rail vehicles, or aircraft.

Described in the related art are micromechanical acceleration sensors having capacitive comb patterns. However, these cannot sense their own static orientation in the gravitational field, but only measure changes of their position in the gravitational field. However, these changes can only be determined if they take place within a certain time. Slower changes cannot be easily distinguished from operating point drifts which are typical of conventional sensors.

In the known approaches above, it has turned out to be a disadvantage that an extremely slow change, for example, during a bending of a support due to material fatigue, cannot be distinguished, for example, from a temperature-contingent zero drift.

SUMMARY OF THE INVENTION

The micromechanical gradient sensor according to the present invention has the advantage that it can measure its own orientation in the gravitational field, while it is stable in the zero point for the evaluation at the same time.

The basic idea of the present invention is that the direction of sensitivity of the gradient sensor is constantly changed relative to the gravitational field by rotary motions, for example, rotary oscillations according to a known time function. If the operating point changes by drifting, then the amplitude of the output signal indeed changes, but since the information about the gradient is not in the amplitude of the output signal of the acceleration sensor but in the phase relation of this signal relative to the motion of the ring body, this information is not influenced by drifting.

Therefore, this sensor does not indicate any false measured values either when the magnitude of the gravitational acceleration changes, for example, in the elevator. However, the sensor does deliver falsified measured values when it is moved on circular paths whose axis of rotation is located parallel to the center of the rotary motion of the sensor. Therefore, the main application lies in the fields indicated at the outset.

According to a preferred embodiment, a control device is provided which is designed in such a way that it continually regulates the excursion to zero, the angle of inclination of the sensor axis relative to the perpendicular being able to be determined from the control signal.

According to a further preferred embodiment, radially outwards directed extension bars are provided on the outer periphery, and the driving device is formed by a comb pattern of capacitor plates having fixed capacitor plates anchored to the substrate and movable capacitor plates attached to the extension bars.

According to a further preferred embodiment, the ring body is a circular ring body which is secured to a support pole provided on the substrate in the ring axis, using a plurality of, preferably four spring bars, which are spaced from each other by 90°.

According to a further preferred embodiment, the acceleration sensing device has at least one pair of mutually opposing acceleration sensors which are each secured to the ring body via a second spring device, each pair of mutually opposing acceleration sensors being designed in such a manner that, as a result of the centrifugal force acting due to the rotary motions, and as a result of the force acting against the spring tension of the two spring devices due to the gravitational acceleration, the pair is able to travel out in a coupled fashion along the sensor axis connecting the acceleration sensors, and running through the ring axis.

According to a further preferred embodiment, the acceleration sensors have frames, preferably U-frames, which are each secured to the ring body tangentially via a preferably U-shaped double spring, a comb pattern of capacitor plates being formed in these frames, which include fixed capacitor plates anchored to the substrate and movable capacitor plates attached to the frame.

According to a further preferred embodiment, the ring body is a circular ring body which, using a plurality of, preferably four spring bars, which are spaced from each other by 90°, is secured to a respective support pole provided on the substrate, the support poles being each provided in prolongation of the spring bars, spaced from each other by 90°.

According to a further preferred embodiment, the acceleration sensing device has an acceleration sensor which is arranged centrically to the ring body, and includes a bar which runs in the direction of the sensor axis, and is secured to the inner periphery of the ring body via four bar springs which run orthogonally to the bar and originate at its ends, the acceleration sensor having a comb pattern of capacitor plates having fixed capacitor plates anchored to the substrate and movable capacitor plates attached to the bar.

DETAILED DESCRIPTION

In the Figures, identical or functionally identical parts are provided with identical reference symbols.

Figure 1:
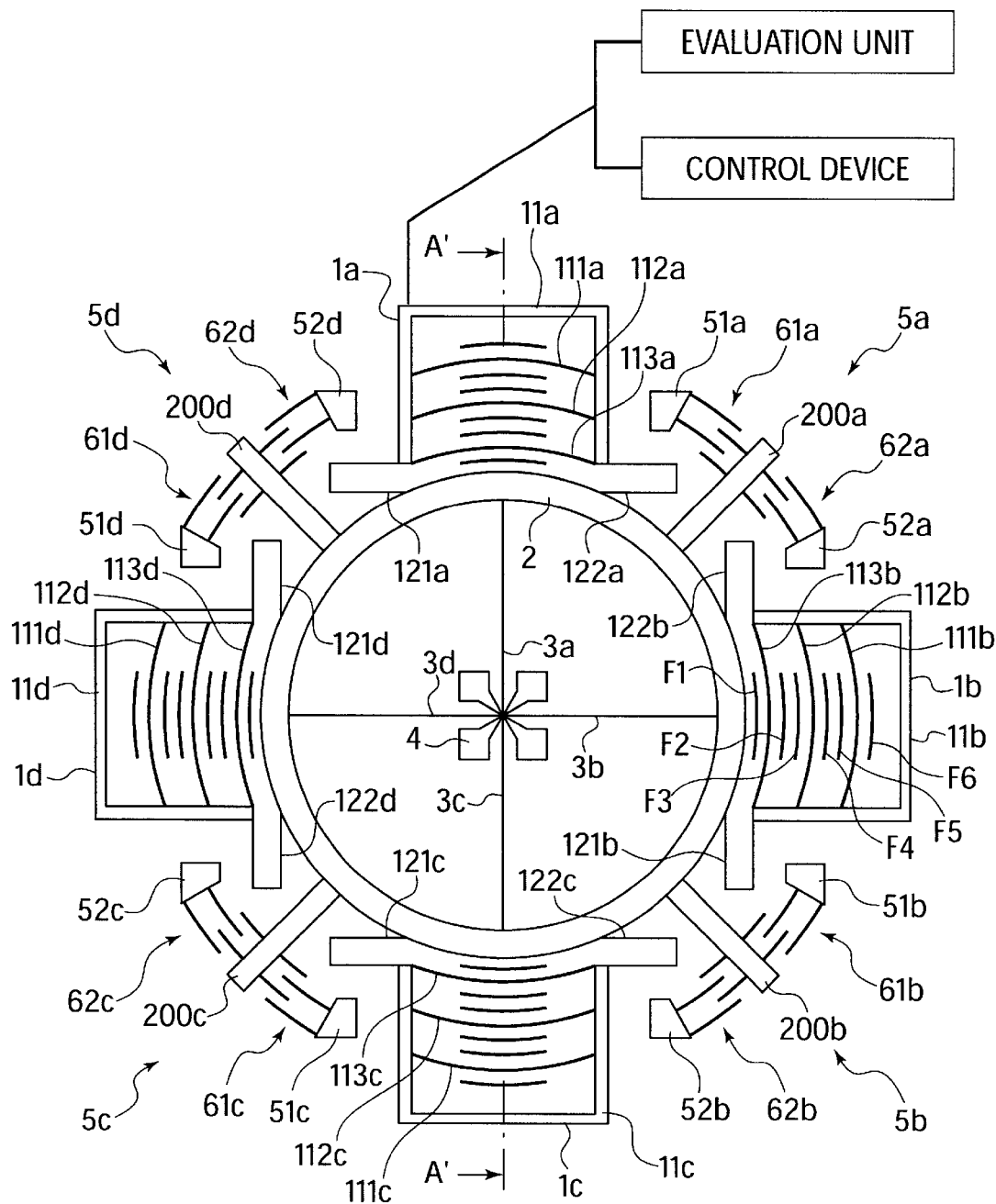
FIG. 1 shows a micromechanical gradient sensor as a first exemplary embodiment of the present invention.

FIG. 1 shows a micromechanical gradient sensor as a first exemplary embodiment of the present invention.

In FIG. 1, reference symbols A–A' refer to a sensor axis, 1*a–d* to acceleration sensors, 2 to a ring body, 4 to a support pole, 3*a–d* to bar springs, 200*a–d* to extension bars, 5*a–d* to comb-type drives, 51/52*a–d* to anchorings (also referred to as suspensions), 61/62*a–d* to a comb pattern of capacitor plates, 121/122*a–d* to U-spring bars, 11*a–d* to U-frames, 111/112/113*a–d* to movable capacitor plates, F1–F6 to fixed capacitor plates.

The gradient sensor according to the first exemplary embodiment, which can be manufactured using the same technology as known micromechanical acceleration sensors, includes a substrate (not shown), above which circular ring body 2 is mounted elastically with the assistance of spring bars 3a–d in a manner allowing it to execute a rotary motion, in fact, comparably to the balance of a timepiece. The four spring bars 3a–d, which are spaced from each other by 90°, are secured centrically to support pole 4 provided on the substrate in the ring axis.

Connected to ring body 2 is a driving device in the form of four comb-type drives 5a–d having a comb pattern of capacitor plates 61a–d, 62a–d for driving ring body 2 to rotary motions about the ring axis.

Provided on the outer periphery of ring body 2 are, in particular, radially outwards directed extension bars 200a–d having movable capacitor plates attached to them. Provided on the substrate are fixed capacitor plates anchored in anchorings 51/52a–d.

The four separate acceleration sensors 1a–d are arranged on ring body 2 tangentially, and are provided in pairs mutually opposing along sensor axis AA' and along an axis running orthogonally to axis AA'. In this exemplary embodiment, these acceleration sensors 1a–d are each composed of a stiff U-frame 11a–d which is connected to ring body 2 with the assistance of soft U-springs 121/122a–d. Within the respective frame 11a–d, circular arc-shaped capacitor plates 111/112/113a–d are mounted in a manner allowing them to move together with ring body 2, the respective U-springs 121, 122a–d, and the respective frame 11a–d.

In this context, the circular arc shape of capacitor plates 111/112/113a–d and of the fixed counter-electrodes has the effect that a pure rotary motion having an infinitesimal centrifugal force does not generate any acceleration signal.

Fixed counter-electrodes F1–F6 are located in pairs opposite to capacitor plates 111/112/113a–d on the substrate. For reasons of clarity, the counter-electrodes F1–F6 are referenced in acceleration sensor 1b only. These counter-electrodes F1–F6, in conjunction with capacitor plates 111/112/113a–d, form a differential capacitance for measuring the accelerations, or rather, forces.

The direction of sensitivity of these acceleration sensors 1a–d is radial, i.e., toward the center of the sensor, i.e., the center of the ring.

To measure the gradient, the ring body is excited into a rotary motion about its center, having a relatively small amplitude of a few degrees. For that purpose, comb-type drives 5a–d are used, which are fixedly connected to ring body 2. If a voltage is alternately applied to fixed capacitor plates which are suspended from suspensions 51, 52a–d, the complete sensor structure is set in the indicated rotary motion. The underlaying mechanism of forces is known and based on the increase of surface of the capacitors caused by the force of the electric field.

During the rotary motion, radial accelerations occur at acceleration sensors 1a–d, which do not compensate each other because of inherent unbalance, and which are measured by acceleration sensors 1a–d.

Figure 3:
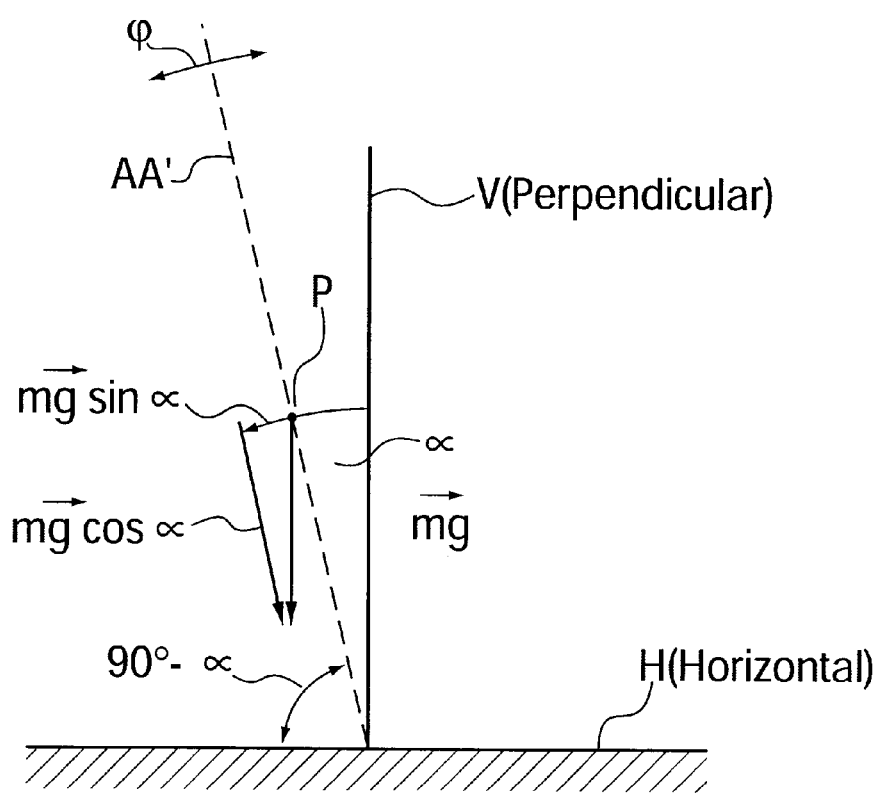
FIG. 3 shows a schematic representation in explanation of the gradient-measuring method.

If the gradient sensor is now brought into the gravitational field with the sensor axis at an angle α to perpendicular V (90°—α to horizontal H), as illustrated in FIG. 3, the gravitational acceleration supervenes in addition to the radial acceleration, in fact, as a component m·g·cos α parallel to sensor axis AA' (acting upon acceleration sensors 1a and 1c), and as a component m·g·sin α perpendicular to sensor axis AA' (acting upon acceleration sensors 1b and 1d).

While the radial acceleration, due to the rotary motion, acts upon all acceleration sensors 1a–d in a direction away from the point of rotation, i.e., the center of the ring, the gravitational acceleration acts equidirectionally.

Therefore, the radial acceleration can be eliminated by subtracting the acceleration signals of two acceleration sensors 1a, 1c, or, 1b, 1d, mounted opposite each other via the circle center.

The result is a measuring signal proportional to the double of the gravitational acceleration, modulated with the expediently sinusoidal angular velocity of ring body 2. This measuring signal is at its maximum precisely when both sensors are aligned exactly perpendicularly to the center of the earth, i.e., when α=0°.

Specifically, the following relations can be derived in this regard.

Acceleration a, which is measured by the acceleration sensor which is at angle α to plumb, a modulation by angle ψ taking place, is given by $$a = g \cdot \cos(\varphi + \alpha) + a_R$$

$$\varphi = \varphi_0 \cos(\omega t) \quad \text{Angle of the sensor oscillation as a function of the time}$$

$$\omega_s = \varphi_0 \omega \cos(\omega t) \quad \text{Angular velocity of the rotary oscillation}$$

$$a_R = r\omega_s^2 \quad \text{Radial acceleration}$$

$$a_R = r\varphi_0^2 \omega^2 \left(\frac{1}{2} + \frac{1}{2}\cos(2\omega t)\right)$$

$$a_1 = g \cdot (\cos\varphi\cos\alpha - \sin\varphi\sin\alpha) + a_R$$

$$a_2 = -g \cdot (\cos\varphi\cos\alpha - \sin\varphi\sin\alpha) + a_R$$

In this context, accelerations $a_1$, and $a_2$ are the signals of two acceleration sensors which mutually oppose each other via the center of the structure.

The demodulation in the electronic signal processing is carried out as explained in the following.

With the assistance of electronic subtraction, the radial acceleration is eliminated:

$$a_1 - a_2 = 2g \cdot (\cos\psi\cos\alpha - \sin\psi\sin\alpha)$$

In the subsequent synchronous demodulation, this differential signal is multiplied by the time function of the rotary oscillation:

$$y = 2g \cdot (\cos\varphi\cos\alpha - \sin\varphi\sin\alpha) \cdot \cos\varphi$$

$$y = 2g \cdot \left(\left(\frac{1}{2} + \frac{1}{2}\cos(2\varphi)\right)\cos\alpha - \frac{1}{2}\sin(2\varphi)\sin\alpha\right)$$

$$y = g \cdot ((1 + \cos(2\varphi))\cos\alpha - \sin(2\varphi)\sin\alpha)$$

$$y = g \cdot (\cos\alpha + \cos(2\varphi)\cos\alpha - \sin(2\varphi)\sin\alpha)$$

$$y = g \cdot \left(\cos\alpha + \frac{1}{2}(\cos(2\varphi - \alpha) + \cos(2\varphi + \alpha)) - \frac{1}{2}(\cos(2\varphi - \alpha) - \cos(2\varphi + \alpha))\right)$$

$$y = g \cdot (\cos\alpha + \cos(2\varphi + \alpha))$$

The result of the multiplication y provides a constant component cos α and a sinusoidal component cos (2ψ+α) which appears with twice the frequency of the rotary oscillation. Using a low pass, the constant component, which only contains the angle information, can now be extracted.

Consequently, one can operate the gradient sensor with only two acceleration sensors 1*a*, 1*c* and carry out a calibration, or with four acceleration sensors 1*a*, 1*c* and 1*b*, 1*d*, and demodulate the measuring signal in correct frequency and phase relation to obtain angle α by which the arrangement is tilted in the gravitational field.

The occurring unwanted but system-inherent radial acceleration is indeed eliminated in the first approximation by subtracting the signals of two acceleration sensors mutually opposing each other via the center of the sensor, however, the distance of the acceleration sensors is expediently located close to the center of the sensor, since the radial acceleration is inversely proportional to the radius. In the same way, expediently, a low frequency of the rotary motion is selected, since the radial acceleration is proportional to the square of the angular velocity. Given an appropriate dimensioning, these radial accelerations, thanks to the micromechanical design, are in the range of the gravitational acceleration, therefore of the same order of magnitude, and do not overload the individual acceleration sensor.

Figure 2:
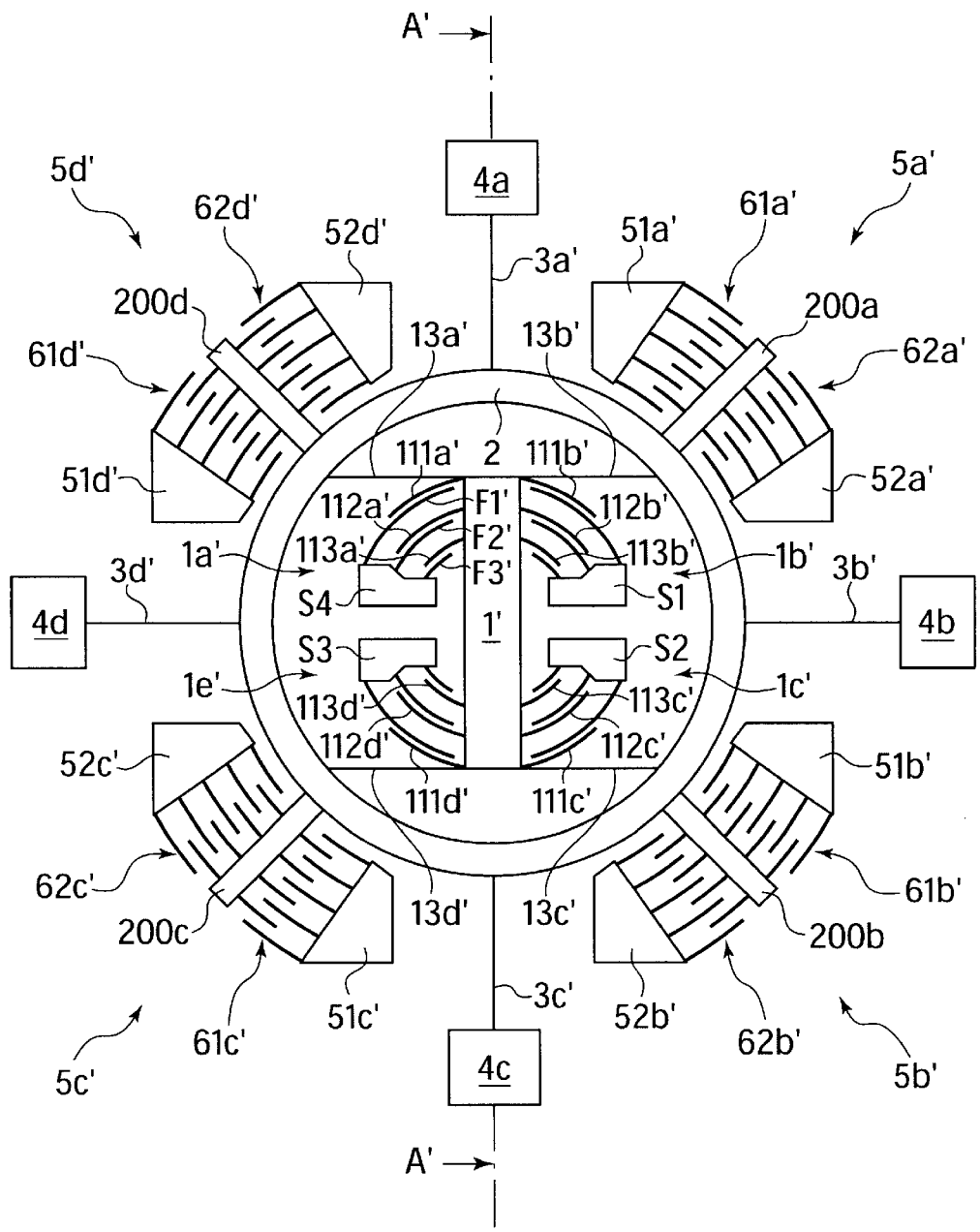
FIG. 2 shows a micromechanical gradient sensor as a second exemplary embodiment of the present invention.

FIG. 2 shows a micromechanical gradient sensor as a second exemplary embodiment of the present invention.

In FIG. 2, in addition to the reference symbols introduced earlier, 5*a'–d'* refers to comb-type drives, 51/52*a'–d'* to anchorings, 61/62*a'–d'* to comb patterns of capacitor plates, 3*a'–d'* to spring bars, 4*a–d* to support poles, 13*a'–d'* to spring bars, 111/112/113*a'–d'* to movable capacitor plates, F1'–F3' to fixed capacitor plates; and S1–S4 to anchorings.

In this second exemplary embodiment, ring body 2 is a circular ring body as well, which, however, using four spring bars 3*a'–d'*, which are spaced from each other by 90°, is secured to a respective support pole 4*a–d* provided on the substrate, the support poles 4*a–d* being each provided in prolongation of the spring bars, spaced from each other by 90°.

Here, the acceleration sensing device includes an acceleration sensor which is arranged centrically to ring body 2, and includes four comb patterns 1*a'*, 1*b'*, 1*c'*, 1*d'*, and a bar 1' which runs in the direction of sensor axis AA', and is secured to the inner periphery of ring body 2 via four bar springs 13*a'–d'* which run orthogonally to the bar and originate at its ends.

The respective appertaining comb pattern of capacitor plates includes fixed capacitor plates F1'–F3' anchored to the substrate and movable capacitor plates 111*a'–d'*, 112*a'–d'*, 113*a'–d'* attached to bar 1', which are in each case circular arc-shaped.

The circular ring, again, is driven by comb-type drives 5*a'–d'* mentioned earlier, which, in the present case, are just dimensioned differently.

The advantage of this second exemplary embodiment is that the interfering radial acceleration does not manifest itself since the acceleration sensor is suspended centrically.

However, this gradient sensor must be held in its zero position, using an electronic position control, which is well-known from the related art, since, otherwise, the center of the seismic mass is displaced from the center of the sensor due to acceleration, and a radial acceleration consequently appears again.

This electronic control can work, for example, in such a way that the comb patterns are used both for determining the position and for correcting the motion. In this context, the measurement of the excursion is carried out during short interruptions of the control, since it requires a different driving of the comb patterns.

In the drawn embodiment, the direction of sensitivity of the acceleration sensor runs along sensor axis AA'. Therefore, this sensor element must also be installed in this direction to be able to fulfill its objective of measurement, namely, the orientation in the gravitational field. Against that, the sensor element according to FIG. 1 can be installed at any angle of the drawing plane.

Although the present invention has been explained above on the basis of preferred exemplary embodiments, it is not limited to them but capable of being modified in many ways.

In particular, the drive is not limited to a comb-type drive but can also be electromagnetic, or be based on piezoresistive of a local heating in the sense of a bimetal effect.

Moreover, the ring body can have a polygonal symmetry.

The evaluation can be carried out by way of a calibration or a differential method of measurement.

Furthermore, the way of manufacturing the gradient sensor is not limited to silicon surface micromechanics, but can be arbitrarily adapted, depending on the requirements and application area.

The sensor according to the present invention can measure one-dimensional tiltings. To measure multidimensional tiltings, one can combine a plurality of such sensors in a suitable manner.

Also included is an evaluation unit for measuring or determining the excursion or travel of the acceleration sensing device and for determining the angle of inclination of sensor axis relative to the perpendicular component or to the direction of gravity.

| List of Reference Symbols | |
|---|---|
| AA' | sensor axis |
| 1a–d | acceleration sensors |
| 2 | ring body |
| 4 | support pole |
| 3a–d | bar springs |
| 200a–d | extension bars |
| 5a–d | comb-type drives |
| 51/52a–d | anchorings |
| 61/62a–d | comb pattern of capacitor plates |
| 121/122a–d | U-spring bars |
| 11a–d | U-frames |
| 111/112/113a–d | movable capacitor plates |
| F1–F6 | fixed capacitor plates |
| 1' | bar |
| 5a'–d' | comb-type drives |
| 51/52a'–d' | anchorings |
| 61/62a'–d' | comb pattern of capacitor plates |
| 3a'–d' | spring bars |
| 4a–d | support poles |
| 13a'–d' | spring bars |
| 111/112/113a'–d' | movable capacitor plates |
| F1'–F3' | fixed capacitor plates |
| S1–S4 | anchorings |

What is claimed is:

1. A micromechanical inclination sensor comprising:

a substrate;

a first spring device;

a second spring device;

a ring body mounted elastically above the substrate via the first spring device;

a driving device connected to the ring body and for driving the ring body to undergo rotary motions about a ring axis; said motions being in a plane parallel to the substrate;

an acceleration sensing device secured to the ring body via the second spring device, wherein:

the acceleration sensing device and the second spring device are formed such that an acceleration sensing axis is in the plane parallel to the substrate and running through the ring axis; and an evaluation unit for measuring an excursion of the acceleration sensing device and for determining an angle of inclination of the sensor axis relative to the direction of gravity.

2. The micromechanical sensor according to claim 1, further comprising:

a control device for continually regulating the excursion to zero, wherein the angle of inclination of the sensor axis relative to the perpendicular component is ascertainable from a control signal produced by the control device.

3. The micromechanical sensor according to claim 1, further comprising:

a plurality of extension bars directed in a radially outwardly direction and provided on an outer periphery of the ring body, wherein the driving device includes:

a comb pattern of fixed capacitor plates and movable capacitor plates, the fixed capacitor plates being anchored to the substrate and the movable capacitor plates being attached to the plurality of extension bars.

4. The micromechanical sensor according to claim 1, further comprising:

a support pole provided on the substrate in the ring axis, wherein:

the first spring device includes a plurality of spring bars, and the ring body is a circular ring body secured to the support pole via the plurality of spring bars.

5. The micromechanical sensor according to claim 4, wherein:

the plurality of spring bars includes four spring bars spaced apart from each other by 90°.

6. The micromechanical sensor according to claim 1, wherein:

the acceleration sensing device includes at least one pair of mutually opposing acceleration sensors, the at least one pair of mutually opposing acceleration sensors being each secured to the ring body via the second spring device, each one of the at least one pair of mutually opposing acceleration sensors being capable of traveling out in a coupled fashion along the sensor axis connecting the acceleration sensors in the at least one pair and of running through the ring axis as a result of the centrifugal force acting due to the rotary motions, and as a result of the force acting against the spring tension of the first spring device and the spring tension of the second spring device due to the gravitational acceleration.

7. The micromechanical sensor according to claim 6, wherein:

the acceleration sensors include a plurality of frames, each of the plurality of frames being secured to the ring body tangentially via the second spring device, a comb pattern of capacitor plates is formed in the plurality of frames, and the comb pattern includes fixed capacitor plates anchored to the substrate and movable capacitor plates attached to the plurality of frames.

8. The micromechanical sensor according to claim 7, wherein the plurality of frames includes a plurality of U-frames.

9. The micromechanical sensor according to claim 7, wherein the second spring device includes a U-shaped double spring.

10. The micromechanical sensor according to claim 1, further comprising:

a plurality of support poles provided on the substrate, wherein:

the first spring device includes a plurality of spring bars, the ring body is a circular ring body secured to a respective one of the plurality of support poles via the plurality of spring bars, and each one of the plurality of support poles is provided as an extension of the plurality of spring bars.

11. The micromechanical sensor according to claim 10, wherein:

the plurality of spring bars includes four spring bars spaced apart from each other by 90°.

12. The micromechanical sensor according to claim 10, wherein:

the second spring device includes a plurality of bar springs, the acceleration sensing device includes an acceleration sensor arranged concentrically with respect to the ring body, and the acceleration sensor includes:

a bar running in a direction of the sensor axis, the acceleration sensor being secured to an inner periphery of the ring body via the plurality of bar springs, and a comb pattern of fixed capacitor plates anchored to the substrate and of movable capacitor plates attached to the bar.

13. The micromechanical sensor according to claim 12, wherein the plurality of bar springs includes four bar springs.

14. A micromechanical gradient sensor comprising:

a substrate;

a first spring device;

a second spring device;

a ring body mounted elastically above the substrate via the first spring device;

a driving device connected to the ring body and for driving the ring body to undergo rotary motions about a ring axis;

an acceleration sensing device secured to the ring body via the second spring device, wherein:

the acceleration sensing device is formed such that the acceleration sensing device is capable of traveling out along a sensor axis running through the ring axis as a result of a centrifugal force acting due to the rotary motions, and as a result of a force acting against a spring tension of the first spring device and a spring tension of the second spring device due to a gravitational acceleration; and an evaluation unit for measuring the travel of the acceleration sensing device and for determining an angle of inclination of the sensor axis relative to a perpendicular component.

15. The micromechanical sensor according to claim 14, further comprising:

a control device for continually regulating the excursion to zero, wherein the angle of inclination of the sensor axis relative to the perpendicular component is ascertainable from a control signal produced by the control device.

16. The micromechanical sensor according to claim 14, further comprising:

a plurality of extension bars directed in a radially outwardly direction and provided on an outer periphery of the ring body, wherein the driving device includes:
   a comb pattern of fixed capacitor plates and movable capacitor plates, the fixed capacitor plates being anchored to the substrate and the movable capacitor plates being attached to the plurality of extension bars.

17. The micromechanical sensor according to claim 14, further comprising:
   a support pole provided on the substrate in the ring axis, wherein:
      the first spring device includes a plurality of spring bars, and
      the ring body is a circular ring body secured to the support pole via the plurality of spring bars.

18. The micromechanical sensor according to claim 17, wherein:
   the plurality of spring bars includes four spring bars spaced apart from each other by 90°.

19. The micromechanical sensor according to claim 14, wherein:
   the acceleration sensing device includes at least one pair of mutually opposing acceleration sensors, the at least one pair of mutually opposing acceleration sensors being each secured to the ring body via the second spring device, each one of the at least one pair of mutually opposing acceleration sensors being capable of traveling out in a coupled fashion along the sensor axis connecting the acceleration sensors in the at least one pair and of running through the ring axis as a result of the centrifugal force acting due to the rotary motions, and as a result of the force acting against the spring tension of the first spring device and the spring tension of the second spring device due to the gravitational acceleration.

20. The micromechanical sensor according to claim 19, wherein:
   the acceleration sensors include a plurality of frames, each of the plurality of frames being secured to the ring body tangentially via the second spring device,
   a comb pattern of capacitor plates is formed in the plurality of frames, and
   the comb pattern includes fixed capacitor plates anchored to the substrate and movable capacitor plates attached to the plurality of frames.

21. The micromechanical sensor according to claim 20, wherein the plurality of frames includes a plurality of U-frames.

22. The micromechanical sensor according to claim 20, wherein the second spring device includes a U-shaped double spring.

23. The micromechanical sensor according to claim 14, further comprising:
   a plurality of support poles provided on the substrate, wherein:
      the first spring device includes a plurality of spring bars,
      the ring body is a circular ring body secured to a respective one of the plurality of support poles via the plurality of spring bars, and
      each one of the plurality of support poles is provided as an extension of the plurality of spring bars.

24. The micromechanical sensor according to claim 23, wherein:
   the plurality of spring bars includes four spring bars spaced apart from each other by 90°.

25. The micromechanical sensor according to claim 23, wherein:
   the second spring device includes a plurality of bar springs,
   the acceleration sensing device includes an acceleration sensor arranged concentrically with respect to the ring body, and
   the acceleration sensor includes:
      a bar running in a direction of the sensor axis, the acceleration sensor being secured to an inner periphery of the ring body via the plurality of bar springs, and
      a comb pattern of fixed capacitor plates anchored to the substrate and of movable capacitor plates attached to the bar.

26. The micromechanical sensor according to claim 25, wherein the plurality of bar springs includes four bar springs.

* * * * *

UNITED STATES PATENT AND TRADEMARK OFFICE
CERTIFICATE OF CORRECTION

PATENT NO. : 6,244,111 B1
DATED : June 12, 2001
INVENTOR(S) : Funk, K.

It is certified that error appears in the above-identified patent and that said Letters Patent is hereby corrected as shown below:

<u>Column 4,</u>
Line 44, change "(cos $\psi$ cos $\alpha$-sin $\psi$ sin $\alpha$)" to -- (cos $\psi$ cos $\alpha$-sin $\varphi$ sin $\alpha$) --
Line 64, change "cos ($2\psi+\alpha$)" to -- cos ($2\varphi+a$) --

Signed and Sealed this

Twenty-sixth Day of November, 2002

*Attest:*

*Attesting Officer*

JAMES E. ROGAN
*Director of the United States Patent and Trademark Office*